(12) United States Patent
Orbach et al.

(10) Patent No.: US 8,200,907 B2
(45) Date of Patent: Jun. 12, 2012

(54) COMPRESSED CACHE CONTROLLER VALID WORD STATUS USING POINTERS

(75) Inventors: Yair Orbach, Shomron (IL); Nahum N. Vishne, Elad (IL); Assaf Rachlevski, Modiin (IL)

(73) Assignee: LSI Corporation, Milpitas, CA (US)

( * ) Notice: Subject to any disclaimer, the term of this patent is extended or adjusted under 35 U.S.C. 154(b) by 731 days.

(21) Appl. No.: 12/337,907

(22) Filed: Dec. 18, 2008

(65) Prior Publication Data

US 2010/0161873 A1 Jun. 24, 2010

(51) Int. Cl.
*G06F 12/00* (2006.01)
*G06F 13/00* (2006.01)
*G06F 13/28* (2006.01)

(52) U.S. Cl. .................. 711/141; 711/118; 711/133

(58) Field of Classification Search .................. 711/118, 711/144, 141
See application file for complete search history.

(56) References Cited

U.S. PATENT DOCUMENTS

| 2006/0026356 | A1* | 2/2006 | Okawa et al. | 711/128 |
| 2009/0217003 | A1* | 8/2009 | Sonnelitter et al. | 712/205 |

OTHER PUBLICATIONS

LabView, What is LabView, Oct. 13, 2005, Available at http://web.archive.org/web/20051013080703/http://www.ni.com/labview/whatis/.*
Verilog, Verilog Resources, Jan. 12, 2005, Available at http://web.archive.org/web/20050112102434/http://www.verilog.com/.*
Wikipedia, VHSIC hardware description language, Apr. 11, 2005, Available at http://web.archive.org/web/20050411030718/http://en.wikipedia.org/wiki/VHDL.*

* cited by examiner

*Primary Examiner* — Jared Rutz
*Assistant Examiner* — Ryan Bertram
(74) *Attorney, Agent, or Firm* — Christopher P. Maiorana, PC

(57) ABSTRACT

An apparatus having a memory and a controller is disclosed. The memory may be configured to (i) store a plurality of cache lines, each of the cache line comprising a plurality of locations including a respective end location and (ii) accessing a particular one of the cache lines identified by a cache address signal. The controller may be configured to (i) buffer a plurality of line pointers, each of the line pointers identifying a respective boundary one of the locations in one of the cache lines and (ii) generate the cache address signal in response to a processor address signal hitting a given one of the locations residing between the respective boundary location and the respective end location.

21 Claims, 8 Drawing Sheets

TABLE I

| CACHE ORGANIZATION WHEN CACHE SIZE IS 2048 WORDS WITH 4 WAYS | A VALID BIT PER WORD (BITS) | TWO POINTERS PER CACHE LINE (BITS) | ONE POINTER PER CACHE LINE PLUS A SINGLE GLOBAL POINTER (BITS) |
|---|---|---|---|
| ORGANIZED AS 32 WORDS PER LINE AND 16 SETS | 32 X 4 X 16 = 2048 | 12 X 4 X 16 = 768 | (6 X 4 X 16) + 5 = 389 |
| ORGANIZED AS 16 WORDS PER LINE AND 32 SETS | 16 X 4 X 32 = 2048 | 10 X 4 X 32 = 1280 | (5 X 4 X 32) + 4 = 644 |
| ORGANIZED AS 8 WORDS PER LINE AND 64 SETS | 8 X 4 X 64 = 2048 | 8 X 4 X 84 = 2048 | (4 X 4 X 64) + 3 = 1027 |

COMPRESSED CACHE CONTROLLER VALID WORD STATUS USING POINTERS

FIELD OF THE INVENTION

The present invention relates to cache circuits generally and, more particularly, to a method and/or apparatus for implementing a compressed cache controller valid word status using pointers.

BACKGROUND OF THE INVENTION

Cache valid identification mechanisms in existing cache designs occupy a large amount of area and consume considerable static and dynamic power. The space and power problems are worse for configurable cache designs involving tradeoffs between a number of sets in the design and line lengths. The configurability is desired when using the same device for different software applications having difference locality characteristics.

The cache valid identification mechanisms identify which of the data words stored in the cache are valid and which contain uninitialized or invalid data. A common way to mark validity is by allocating a valid bit for every data word stored in the cache memory. The implementation of the valid bit is usually accomplished with (i) registers which are easy to access and enable fast access or (ii) a memory where allowed by access time constraints.

Referring to FIG. 1, a diagram of a conventional cache valid identification mechanism 20 under a static condition is shown. An example cache line 22 contains several locations 24a-24x, each location storing a data word. A multi-bit register 26 is allocated to the cache line 22. The register 26 contains multiple bits 28a-28x, a single bit for each of the locations 24a-24x. Arrows illustrate links between the register bits 28a-28x and the corresponding locations 24a-24x.

The register 26 reflects the validity state of the cache line 22. The data words in the locations 24a-24x that correspond to set bits (i.e., logical one bits) 28a-28x are valid. The data words in the locations 24a-24x that correspond to reset bits (e.g., logical zero bits) 28a-28x are invalid. When data is fetched from a main memory to a cache line 22, the fetched data may fill only a portion of the cache line 22. As a result, some of the locations (i.e., 24a-24j) contain stale data words and are marked as invalid. The fetched data words are stored in the cache line 22 from a starting address (i.e., location 24k) to the end of the cache line (i.e., location 24x). The fetched data words are marked as valid.

Referring to FIG. 2, a diagram of the conventional cache valid identification mechanism 30 under a fetch condition is shown. While a fetch burst is in progress, the bits 28a-28x corresponding to the new data words already copied into the cache line 22 (i.e., locations 24k-24m) are set to valid. The locations of the data words yet to be fetched (i.e., locations 24n-24x) are marked as invalid until the new data words have been stored in the cache line 22. As each new data word is written into a location 24a-24x during the burst, the corresponding bit 28a-28x is set to indicate valid. Upon reset, or when a word is flushed out of the cache memory, the corresponding valid bits 28a-28x are reset.

Referring to FIG. 3, a block diagram of a portion of a conventional cache 40 is shown. The cache 40 has a group of comparators 42 that compare a high portion of an address with tags stored in a tag array 44. Upon a cache hit, the comparators 42 identify a particular register (i.e., register 26) associated with the cache hit from among a group of registers 46. A multiplexer 48 uses a lower portion of the address to route a particular register bit to indicate a valid/not valid location.

SUMMARY OF THE INVENTION

The present invention concerns an apparatus having a memory and a controller. The memory may be configured to (i) store a plurality of cache lines, each of the cache line comprising a plurality of locations including a respective end location and (ii) accessing a particular one of the cache lines identified by a cache address signal. The controller may be configured to (i) buffer a plurality of line pointers, each of the line pointers identifying a respective boundary one of the locations in one of the cache lines and (ii) generate the cache address signal in response to a processor address signal hitting a given one of the locations residing between the respective boundary location and the respective end location.

The objects, features and advantages of the present invention include providing a method and/or apparatus for implementing a compressed cache controller valid word status using pointers that may (i) use less space, less dynamic power and less static power compared with conventional designs, (ii) use a single pointer per cache line, (iii) check if the cache line is being filled for every access request, (iv) use a single global pointer to support the cache line currently being filled, (v) keep track of boundaries between invalid cache line locations and valid cache line locations and/or (vi) provide reconfigurability between the number of sets and the cache line lengths.

BRIEF DESCRIPTION OF THE DRAWINGS

These and other objects, features and advantages of the present invention will be apparent from the following detailed description and the appended claims and drawings in which:

FIG. 8 is a table illustrating the number of bits used to represent valid/invalid data.

DETAILED DESCRIPTION OF THE PREFERRED EMBODIMENTS

Data words fetched from a main memory to a cache are typically transferred in a burst of several words. Many bus systems generally allow the burst to start frdm any position in a multi-word line, but may not be able to halt the burst before completing at an end of the line. Such bus policies may cause the corresponding valid/invalid statuses of the cache line to form a steady state pattern once the fetch operation has completed. In particular, the bus policies may result in a first sequence of invalid status locations followed by a second sequence of valid status locations to the end of the cache line.

While a specific cache line is being fetched, the corresponding valid/invalid statuses generally form a different data pattern. Unlike the steady state pattern that contains only two segments, a dynamic pattern created during the cache line fetch may contain three segments. The dynamic pattern may start with the first sequence of invalid statuses, followed by the second sequence of valid statuses and include a third sequence of invalid statuses until the fetch has completed.

Each cache line generally includes multiple locations (e.g., 16 or 32 locations) with each location buffering a data word. The three-segment pattern may be logically represented by two pointers. A first pointer may identify a first boundary between the first segment of invalid status locations and the second segment of valid status locations. A second pointer may identify a second boundary between the second segment of valid status locations and the third segment of invalid status locations. For example, a 16-location cache line may be represented by two 5-bit pointers. The 10 bits used to create the two pointers generally saves 6 bits compared with a 16-bit version of the register 26. In another example, a 32-location cache line may be represented by two 6-bit pointers for a total of 12 bits. The 12 bits used by the two pointers may save 20 bits compared with a 32-bit version of the register 26.

Generally, a single cache line is fetched from the main memory at any given time. Therefore, a single "second" pointer may be allocated to the cache line currently being fetched. All of the other cache lines may be associated with a respective line pointer. Using a "second" global pointer may reduce the total number of pointers by almost half. Hence, additional space and power savings may be achieved.

Figure 1:
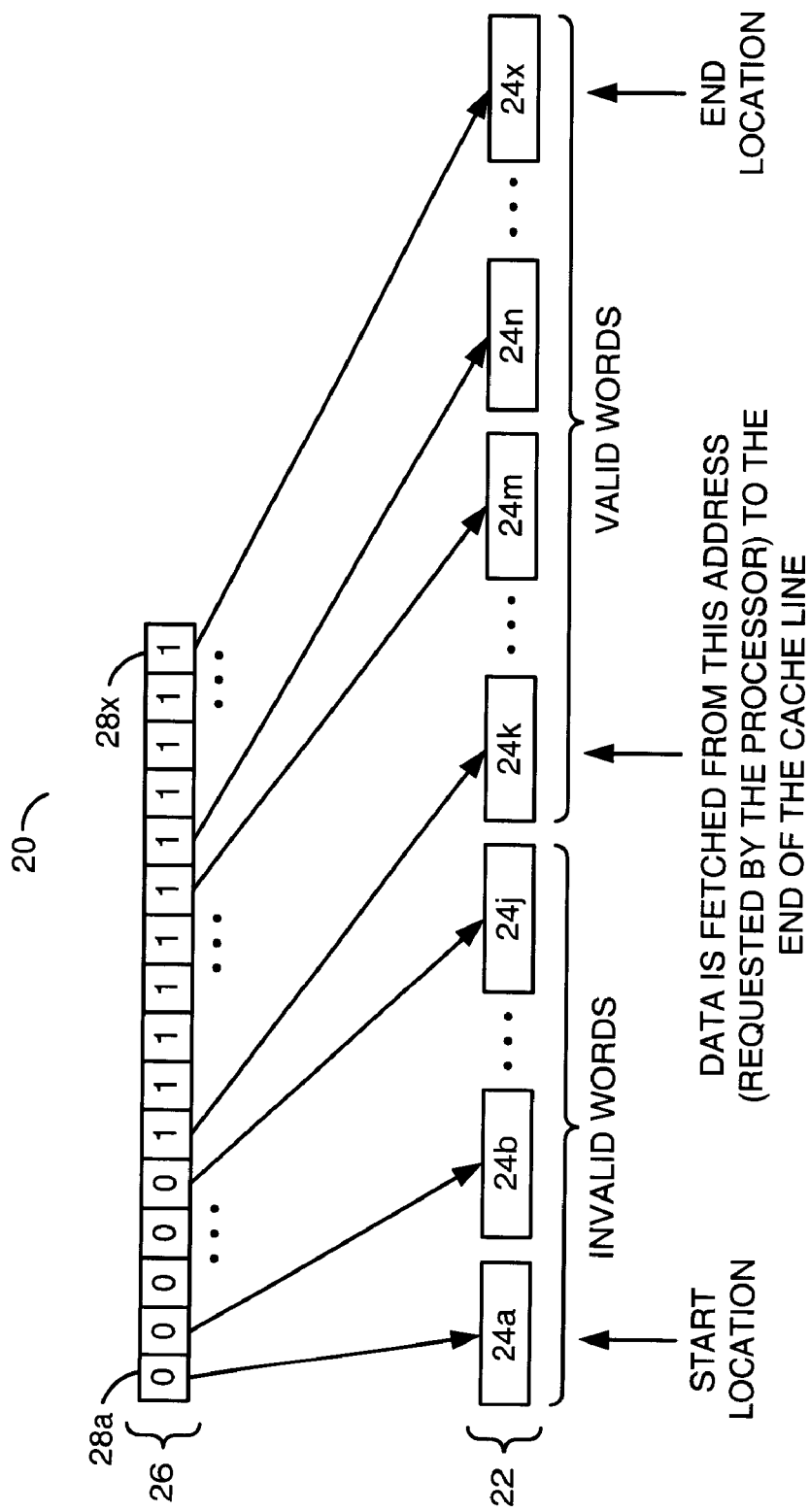
FIG. 1 is a diagram of a conventional cache valid identification mechanism under a static condition.
Figure 2:
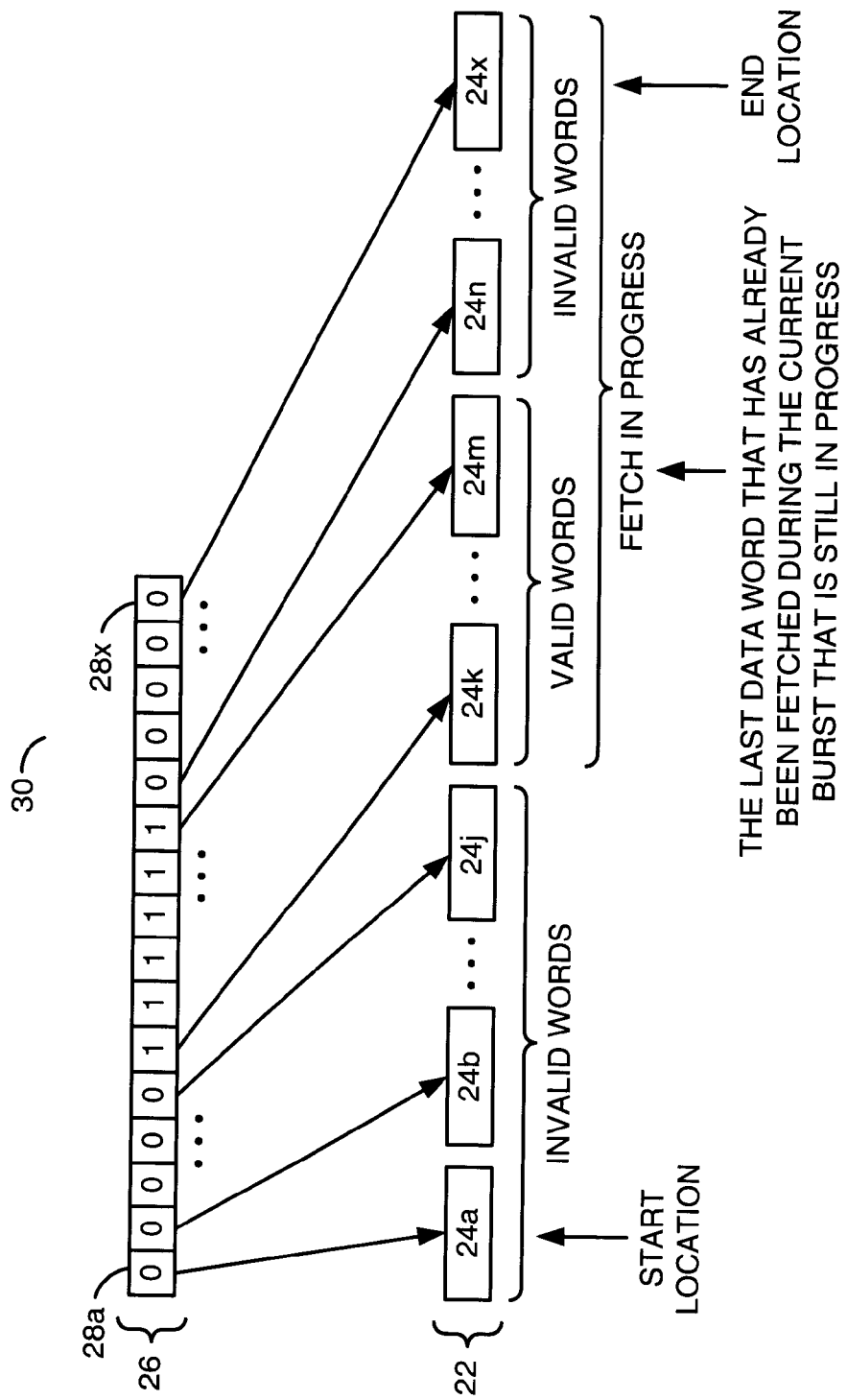
FIG. 2 is a diagram of the conventional cache valid identification mechanism under a fetch condition.
Figure 3:
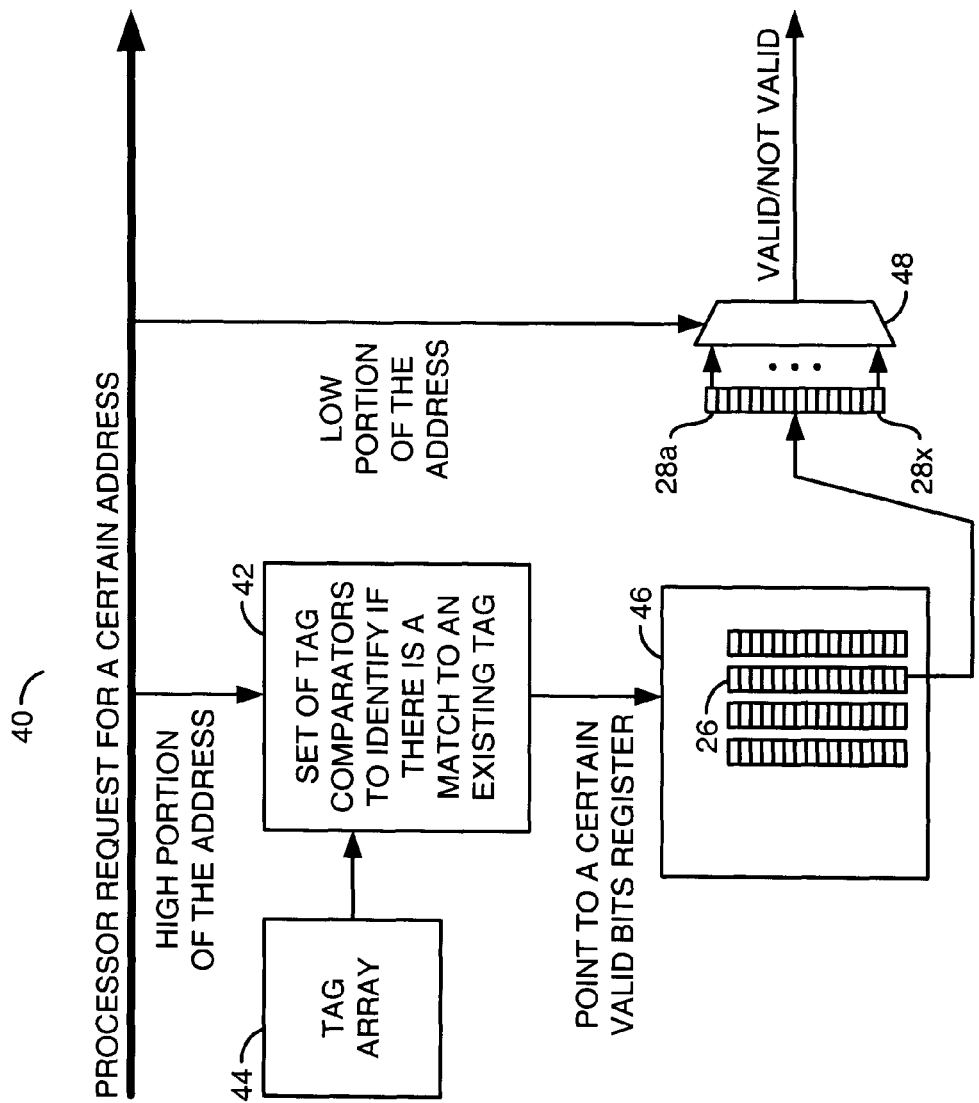
FIG. 3 is a block diagram of a portion of a conventional cache.
Figure 4:
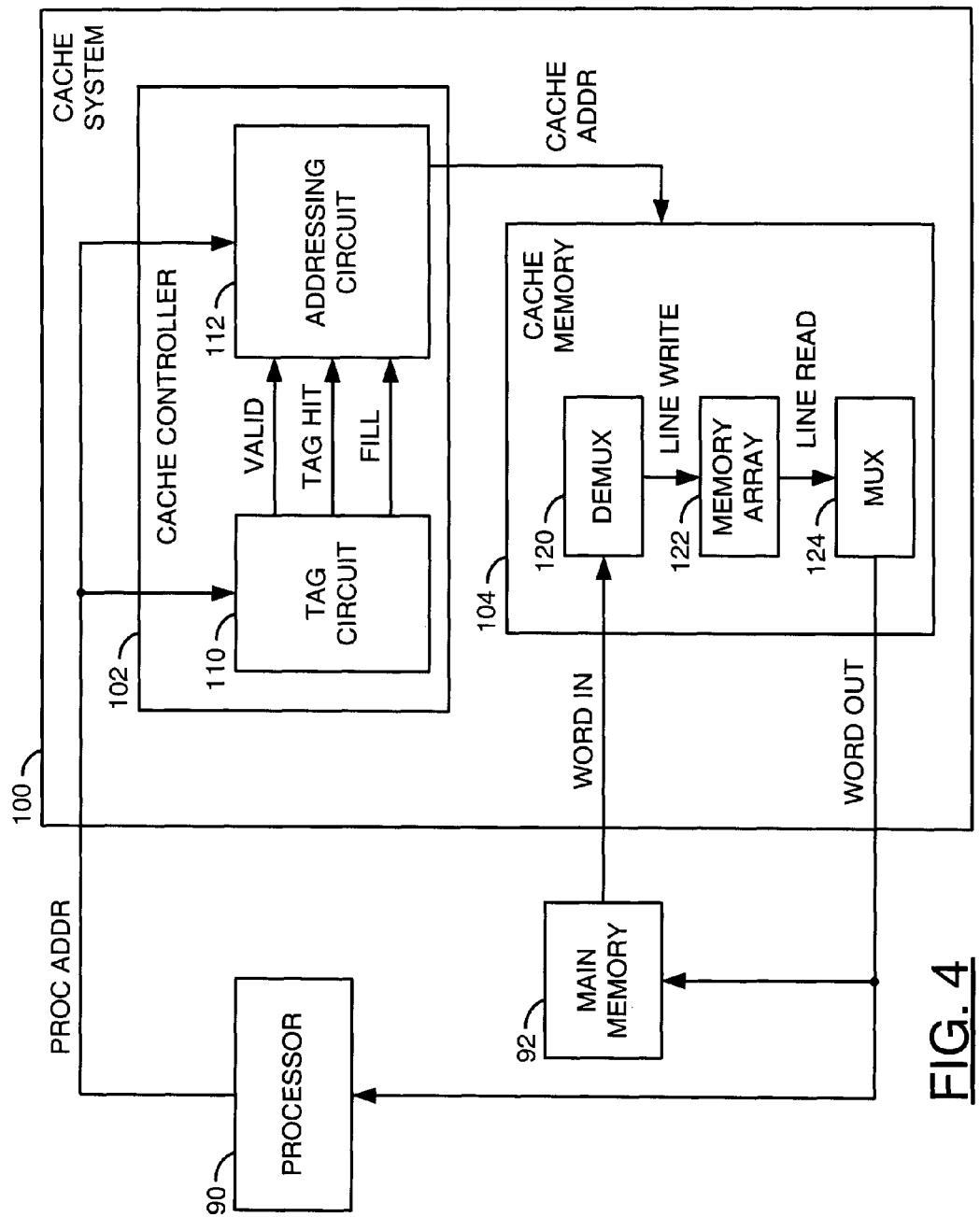
FIG. 4 is a block diagram of a portion of an apparatus in accordance with a preferred embodiment of the present invention.

Referring to FIG. 4, a block diagram of a portion of an apparatus 100 is shown in accordance with a preferred embodiment of the present invention. The apparatus 100 may be implemented as a cache circuit or system in communication with a processor circuit 90 and a main memory circuit 92. The apparatus 100 generally comprises a circuit 102 and a circuit 104. An address signal (e.g., PROC ADDR) may be received by the circuit 102 from the circuit 90. The circuit 102 may generate a signal (e.g., CACHE ADDR) transferred to the circuit 104. An input signal (e.g., WORD IN) may be generated by the circuit 92 and presented to the circuit 104. The circuit 104 may generate an output signal (e.g., WORD OUT) that is returned to the circuit 90 and the circuit 92. The circuits illustrated in FIG. 4 may represent modules and/or blocks that may be implemented as hardware, software, a combination of hardware and software, or other implementations.

The circuit 102 may be implemented as a cache controller circuit. The circuit 102 is generally operational to (i) buffer a plurality of line pointers, (ii) generate the signal CACHE ADDR in response to cache hit by the signal PROC ADDR, (iii) arrange a cache memory into multiple sets of cache lines of a first length and (iv) dynamically rearrange the cache memory into multiple different sets of cache lines of a second length. Each of the line pointers may identify a respective boundary location in a corresponding cache line. A cache hit is usually asserted when (i) the address value received in the signal PROC ADDR fall between the boundary and the end of the corresponding cache line inclusively and (ii) the particular location identified by the address value has the valid status.

The circuit 104 generally comprises a cache memory array circuit. The circuit 104 may be arranged as multiple cache lines. The circuit 104 may receive data words in the signal WORD IN. The circuit may present data words in the signal WORD OUT. Each of the cache lines may include multiple addressable locations (e.g., 16 or 32). The number of cache lines in the circuit 104 may be determined by a number of sets (e.g., 16, 32 or 64 sets) multiplied by a number of ways (e.g., 2, 4, 8 or 16 ways). For example, a circuit 104 that is 4-way set associative with 32 sets may have 32 sets×4 ways=128 cache lines.

Given the above example 4-way set associative memory, a normal cache design would utilize 128 valid bits registers. At 16 locations per cache line, the normal design would utilize 128×16=2048 bits to store the valid/invalid information. In some embodiments of the present invention, the valid/invalid information may be represented by the line pointers bits plus the global pointer bits. Each of the line pointers may have approximately $\log_2$(number of locations)+1 bits. The global pointer may have approximately $\log_2$(number of location) bits. For example, the example 128 cache lines with 16 locations per cache line may be represented by (128×5) line pointer bits+4 global pointer bits=644 bits. Since every bit is generally implemented as a flip flop that consumes area and power, the use of the pointers may represent a significant saving over the use of individual valid/invalid bits.

The sets of the circuit 104 may be dynamically configured to trade between the set number and a cache line length. The reconfigurability may be useful in situations where the memory 104 holds different types of data at different times. For example, voice applications generally have a high locality and a long line. Fetching fewer long bursts is usually more efficient than fetching many short bursts since the overhead of a new burst may be greater than fetching more words in a burst. Therefore, the circuit 104 may be configured as a few sets with long cache lines for a voice application. In contrast, video applications generally have a different nature. Video applications may use many small data segments simultaneously. Therefore, having a large number of sets with small cache lines may be optimal for the circuit 104.

When a system may serve both voice and video (or any two types or applications that differ in the optimal selection of sets number and line length) the apparatus 100 should be configurable. A cost of such a common configurable cache memory system is incurred by (i) extending the valid bits registers to account for the longest cache line configuration and (ii) having the number of valid bits registers match the number of the sets at the maximum configuration. As such, common cache designs practically double the number of valid bits when allocating a bit per data word. In some embodiments of the present invention using the pointers, the cost of reconfigurability may be a bit per the maximum number of sets.

Consider an example having 2048 words with 4 ways and switching between a first configuration and a second configuration. Further consider the 2048 words may be arranged in (i) the first configuration as 16 sets of 32 words per cache line (e.g., for voice) and (ii) the second configuration as 32 sets of 16 words per cache line (e.g., for video). Using the common implementation of a bit per word would have 32 bits/line maximum×4 ways×32 sets maximum=4096 bits of valid/invalid information (instead of 2048 for a non-configurable cache). In contrast, the pointers may have 6 bits/pointer×4 ways×32 sets=768 bits (instead of 384 bits or 640 bits for a non configurable cache).

The circuit 92 may be read from and written to by the circuit 90 through the apparatus 100. The circuit 92 and the apparatus 100 may support any normal read policy and any normal write policy to exchange data between the apparatus 100 and the circuit 92. During a fetch operation, the circuit 92 may generate a burst of sequential data words in the signal WORD IN.

The circuit 102 generally comprises a circuit 110 and a circuit 112. The signal PROC ADDR may be received by the circuit 110. A signal (e.g., VALID) may be generated by the circuit 110 and presented to the circuit 112. The circuit 110 may also generate a signal (e.g., TAG HIT) that is presented to the circuit 112. A signal (e.g., FILL) may be received by the circuit 112 from the circuit 110. The signal CACHE ADDR may be generated by the circuit 112.

The circuit 110 may be implemented as a tag comparison circuit. The circuit 110 may be operational to compare the address values received in the signal PROC ADDR with internally stored tags to determine if the requested tag of the address is in the circuit 104 or not. If the requested tag of the address is found in one of the cache lines, the circuit 110 may assert the signal TAG HIT, otherwise the signal TAG HIT may be deasserted. If the requested tag of the address is found, the circuit 110 may also report the valid/invalid status of the corresponding location to the circuit 112 in the signal VALID. If the corresponding location is in a cache line actively being fetched, the circuit 110 may assert the signal FILL, otherwise the signal FILL may be deasserted.

The circuit 112 may be implemented as an addressing circuit. The circuit 112 may be operational to generate the signal CACHE ADDR based on the address value received in the signal PROC ADDR, the valid/invalid status received in the signal VALID, the assertion of the signal TAG HIT and the asserted/deasserted condition of the signal FILL. The signal CACHE ADDR may be used to access a particular location that has been requested by the circuit 90.

If the signal TAG HIT is asserted and the signal VALID indicates a valid location, the circuit 112 may declare a cache hit. Thereafter, the circuit 112 may generate an appropriate address value in the signal CACHE ADDR to access the requested address value received in the signal PROC ADDR. The circuit 104 may respond to the signal CACHE ADDR by presenting the data word residing in the accessed location in the signal WORD OUT.

If the signal TAG HIT is asserted, the signal FILL is asserted and the signal VALID indicates invalid location, the circuit 112 may recheck the signal VALID until the signal FILL is deasserted. If the signal VALID continues to report an invalid location after the signal FILL is deasserted, the circuit 112 may declare a cache miss and appropriate fetch from the circuit 92 may be initiated. If the signal VALID reports a valid location before or at the time that the signal FILL is deasserted, the circuit 122 may declare a cache hit and generate an appropriate address value in the signal CACHE ADDR.

The circuit 104 generally comprises a circuit 120, a circuit 122 and a circuit 124. The signal WORD IN may be received by the circuit 120. A signal (e.g., LINE IN) may be generated by the circuit 120 and received by the circuit 122. The circuit 122 may generate a signal (e.g., LINE OUT) that is received by the circuit 124. The circuit 124 may generate the signal WORD OUT. The signal CACHE ADDR may be received by each of the circuits 120, 122 and 124.

The circuit 120 generally implements a demultiplexing type of circuit. The circuit 120 may be operational to buffer the data words received in the signal WORD IN during a burst operation. The buffered words may be assembled into a complete line of data words starting at a location determined by a lower portion of the signal CACHE ADDR. The newly formed line may be transported to the circuit 122 to replace an existing cache line.

The circuit 122 generally implements a memory array circuit. The circuit 122 may contain multiple cache lines, each having multiple addressable locations. Accessing a particular cache line for read operations and write/fetch operations may be controlled by an upper portion of the signal CACHE ADDR. New data words received in the signal LINE IN may be written into the circuit 122. Lines read from the circuit 122 may be presented in the signal LINE OUT.

The circuit 124 generally implements a multiplexer type of circuit. The circuit 124 may be operational to buffer and route the data words received in the signal LINE OUT to the signal WORD OUT. Control of the routing may be achieved through a lower portion of the signal CACHE ADDR.

Figure 5:
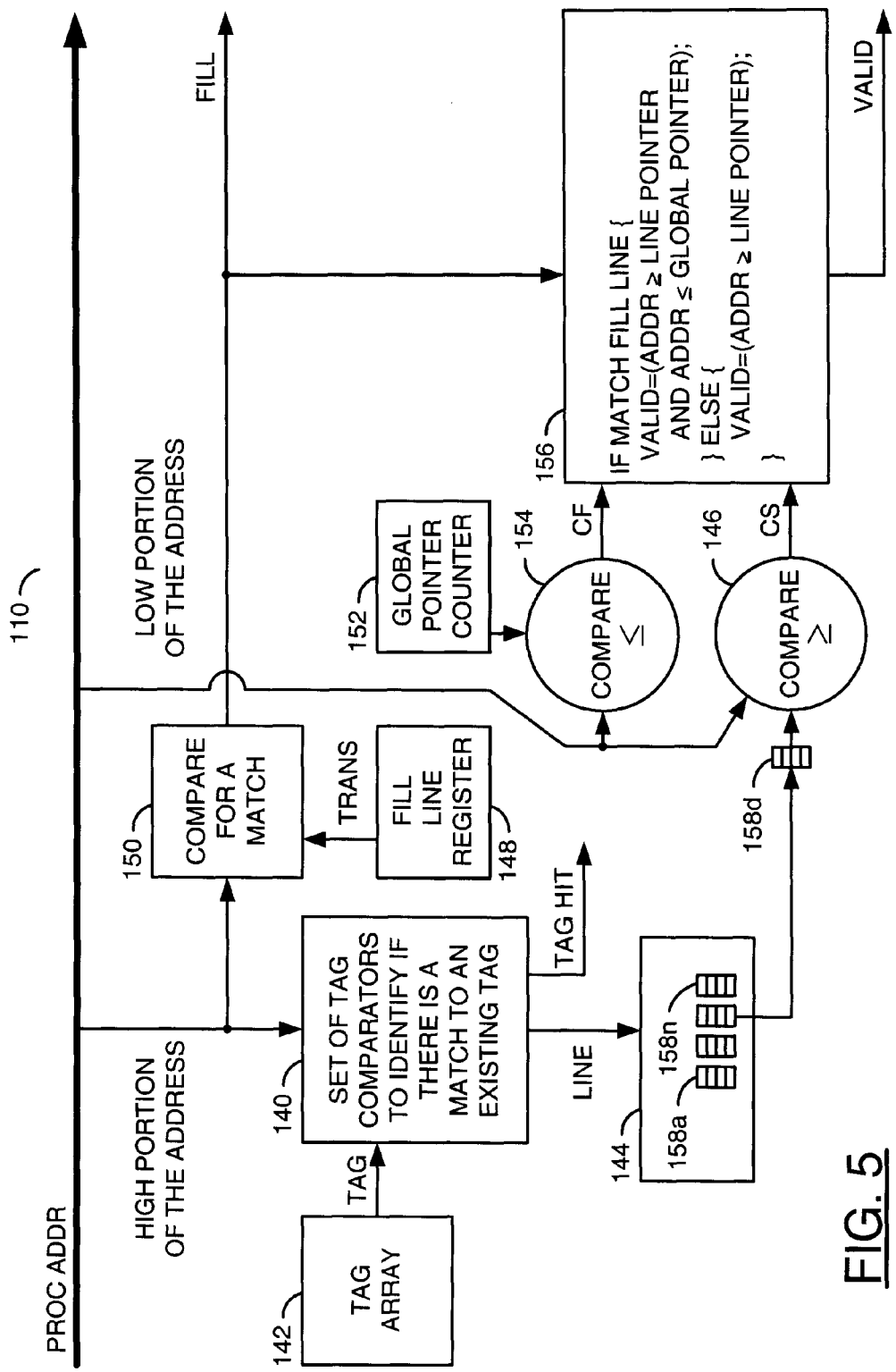
FIG. 5 is a block diagram of an example implementation of a tag circuit.

Referring to FIG. 5, a block diagram of an example implementation of the circuit 110 is shown. The circuit 110 generally comprises a circuit 140, a circuit 142, a circuit 144, a circuit 146, a circuit 148, a circuit 150, a circuit 152, a circuit 154 and a circuit 156. The signal PROC ADDR may be received by the circuits 140, 146, 150 and 154. The signal TAG HIT may be generated by the circuit 140. A signal (e.g., LINE) may be generated by the circuit 140 and received by the circuit 144. The signal FILL may be generated by the circuit 150 and received by the circuit 156. The signal VALID may be generated by the circuit 156. A signal (e.g., TAG) may be presented from the circuit 142 to the circuit 140. A signal (e.g., TRANS) may be presented from the circuit 148 to the circuit 150. A signal (e.g., CS) may be generated by the circuit 146 and presented to the circuit 156. The circuit 156 may also receive a signal (e.g., CF) generated by the circuit 154. The circuits illustrated in FIG. 5 may represent modules and/or blocks that may be implemented as hardware, software, a combination of hardware and software, or other implementations.

The circuit 140 may be implemented as a tag comparator circuit. The circuit 140 may be operational to identify if the signal PROC ADDR has a match to an existing tag. If a match is found, the circuit 140 may assert the signal TAG HIT and identify the hit cache line in the signal LINE, otherwise the signal TAG HIT may be deasserted.

The circuit 142 may be implemented as a tag array circuit. The circuit 142 may store the tags associated with the data words currently held in the circuit 104/122. The tags may be presented to the circuit 140 in the signal TAG.

The circuit 144 may be implemented as a pointer array circuit. The circuit 144 generally stores the line pointers 158a-158n. The circuit 144 may present the boundary location of a particular line pointer (e.g., 158d) to the circuit 146 when selected by the value received in the signal LINE.

The circuit 146 may be implemented as a comparison circuit. The circuit 146 is generally operational to compare the boundary location received from the circuit 144 with the lower portion of the address received in the signal PROC ADDR. If the address carried by the signal PROC ADDR is greater than or matches the boundary location (e.g., in the valid second segment of the cache line), the circuit 146 may assert the signal CS. If the address is less than the boundary location (e.g., in the invalid first segment), the signal CS may be deasserted.

The circuit 148 may be implemented as a register. The circuit 148 may store a value that identifies a cache line currently being filled (e.g., in transition). The identity of the cache line being filled may be transferred to the circuit 150 in the signal TRANS. If no cache lines are being filled, the circuit 148 may hold a default (e.g., out-of-range) value.

The circuit 150 generally implements a comparison circuit. The circuit 150 may be operational to generate the signal FILL by comparing the high portion of the address received in the signal PROC ADDR with a value carried in the signal TRANS. If the address matches the transition cache line, the signal FILL may be asserted. If the address does not match the transition cache line, or the value in the signal TRANS is the default value, the signal FILL may be deasserted.

The circuit 152 may be implemented as a counter. The circuit 152 may store a value of the global pointer when a given cache line is being filled. An initial value of the global pointer may be associated with the initial location of valid data received in the current fetch operation. As each new data word is added to the cache line, the global pointer may be incremented to the next location. The global pointer may point to the last location of the given cache line to be filled with valid data. If no cache lines are being filled, the circuit 152 may (i) point to a start location, (ii) point to an end location or (ii) hold a default value that points to a virtual location either beyond the end location or before the start location of the given cache line.

The circuit 154 may implement a comparison circuit. The circuit 154 is generally operational to compare the lower portion of the address in the signal PROC ADDR with the global pointer stored in the circuit 152. The circuit 154 may assert the signal CF while the lower portion of the address is no greater than the global pointer (e.g., in either the valid second segment or in the invalid first segment of the cache line). The signal CF may be deasserted while the address is greater than the global pointer (e.g., in the invalid third segment of the cache line).

The circuit 156 generally implements a logic circuit. The circuit 156 may be operational to generate the signal VALID based on the signal CS, the signal CF and the signal FILL. While the signal FILL is deasserted (e.g., the current cache line is not involved in a fetch operation), the circuit 156 may generate the signal VALID to match the signal CS. If the signal CS is asserted, the signal VALID may be asserted. If the signal CS is deasserted, the signal VALID is deasserted. While the signal FILL is asserted (e.g., the current cache line is actively being fetched), the signal VALID may be generated based on both the signal CS and the signal CF. If the signal CS is asserted (e.g., the address is greater than or matches the boundary location) and the signal CF is asserted (e.g., the address is less than or matches the global pointer), the signal VALID may be asserted. If the signal CS is deasserted (e.g., the address is less than the boundary pointer) or the signal CF is deasserted (e.g., the address is greater than the global pointer), the signal VALID may be deasserted.

Figure 6:
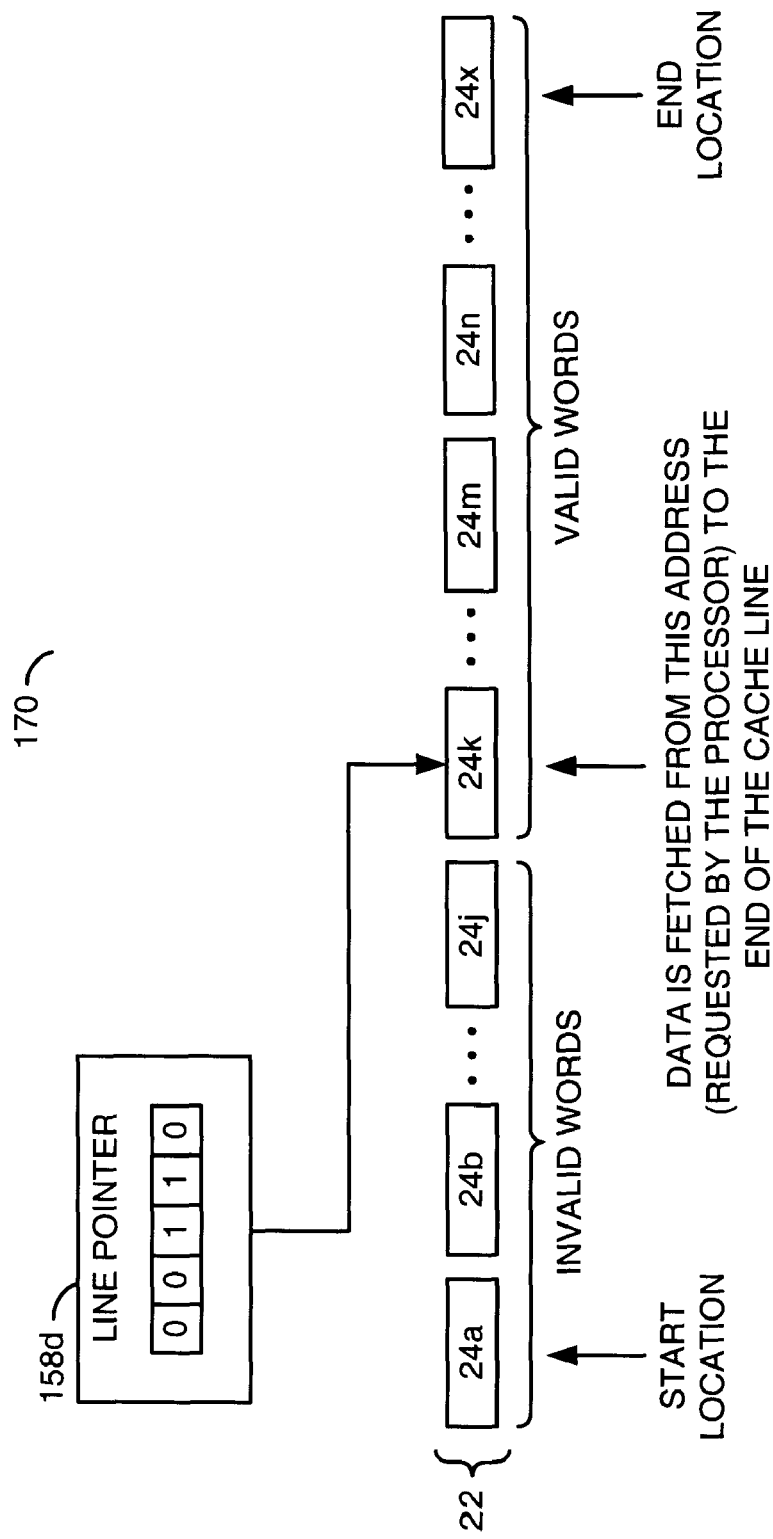
FIG. 6 is a diagram of an example operation of line pointers under a static condition.

Referring to FIG. 6, a diagram of an example operation 170 of the line pointers under a static condition is shown. Multiple pointer registers (the register 158d is shown as an example) may be associated with the cache lines (the cache line 22 is shown as an example), a single pointer register per respective cache line. The pointer register 158d may be loaded with a boundary location (e.g., 24k) of the initial data word fetched for the cache line 22. The boundary location may be identified by the requested address value in the signal PROC ADDR. The valid data words (e.g., valid status) may reside in all locations between the boundary location 24k and the end location 24x inclusively. All other locations from a start location 24a up to the location 24j (adjoining the boundary location 24k) may be considered to have the invalid status.

If a cache line is not identified by the circuit 150 as being actively being filled by a fetch operation, a requested data word may be detected as valid when the position of the requested data word is greater or equal to boundary location identified by the line pointer. At a rest or when the line 22 is flushed, the line pointer 156d may point to the virtual location either beyond the end location 24x or before the start location 24a. Pointing to the special virtual location generally indicates that all of the locations 24a-24x have the invalid status.

Figure 7:
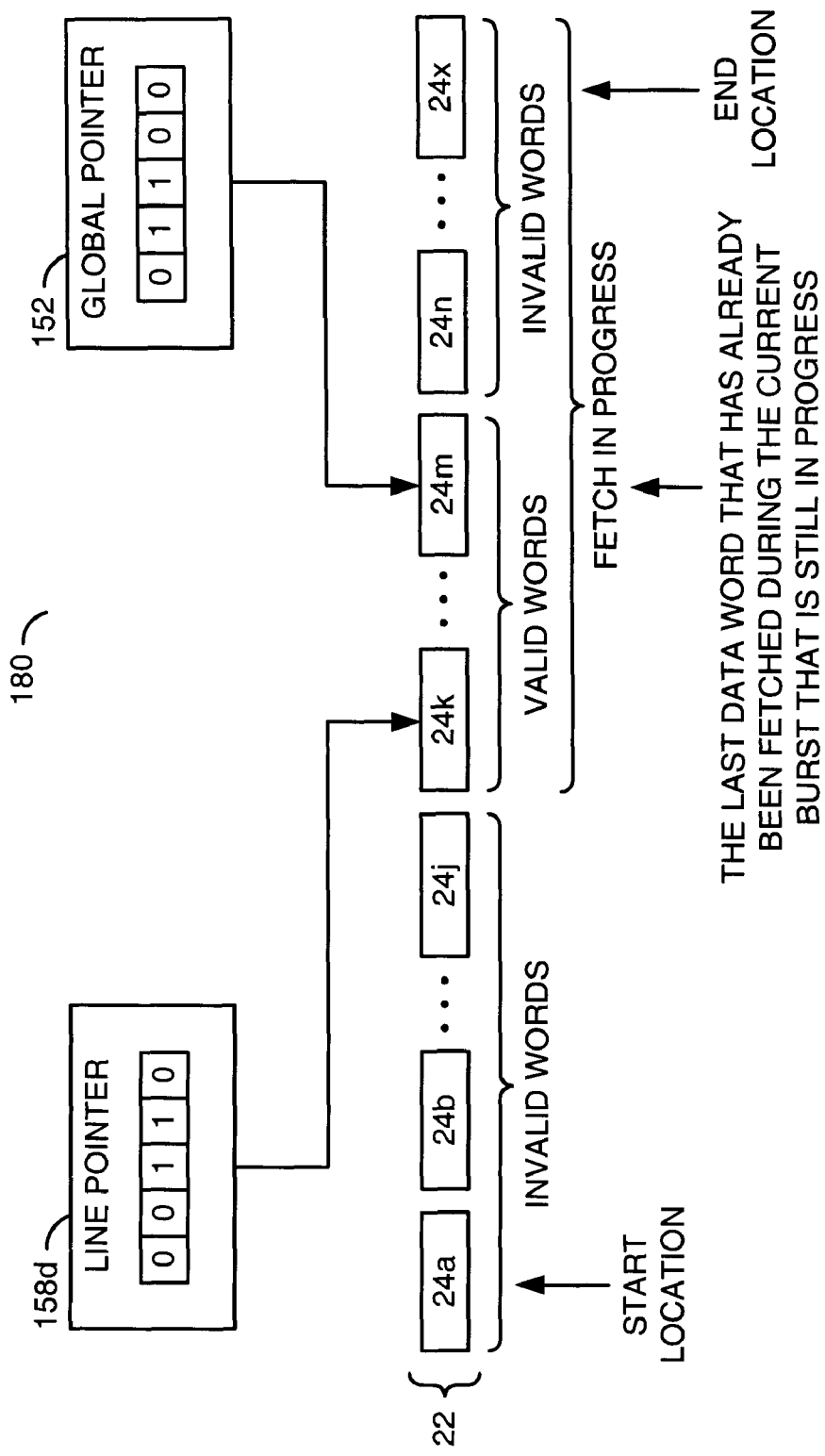
FIG. 7 is a diagram of an example operation of the line pointers under a fetch condition.

Referring to FIG. 7, a diagram of an example operation 180 of the line pointers under a fetch condition is shown. In the example, the valid/invalid status of some locations 24a-24x of the cache line 22 may dynamically change as new data words are added to the cache line 22. The register 154 may hold the global pointer value. As illustrated, the global pointer may point to the location 24m to indicate that location 24m has been fetched during the current burst, but the subsequent locations 24n-24x still have not been fetched. The first segment of invalid data words may range from the start location 24a to the location 24j. The second segment of valid data words may extend from locations 24k to 24m inclusive. The third segment of invalid data may range from the location 24n to the end location 24x. As each new data words is fetched from the circuit 92, the global pointer may be progressed to the next location until the end location 24x of the cache line is filled. In some embodiments, the global pointer may be repositioned to the virtual location after the end location 24x has been filled. In other embodiments, the global pointer may be left at the end location 24x.

Referring to FIG. 8, a TABLE I illustrating the number of bits used to represent valid/invalid data is shown. The leftmost column generally states the cache organization. In the three example organizations, a 4-way set associative 2048 location cache may be arranged as (i) 32 words/cache line and 16 sets, (ii) 16 words/cache line and 32 sets or (iii) 8 words/cache line and 64 sets. The second column generally illustrates the number of valid/invalid bits utilized if each valid/invalid bit pointed to a single word. The third column may illustrate the number of bits used to create two pointers per cache line to identify the valid/invalid words. The rightmost column generally illustrates the number of bits used to create a line pointer for each of the cache lines plus a single global pointer to handle a cache line in the process of being filled by a fetch operation.

Some embodiments of the present invention may replace each valid/invalid bits register, which has a corresponding bit per word in each cache line, by a pointer that separates between the invalid region and the valid region. An advantage may be taken of the fact that in ordinary cache designs no "holes" (e.g., invalid data) may exist in the valid region or segment. A specific line that is being filled temporarily has an invalid region, a valid region and another invalid region. Therefore, an additional global pointer is created. The global pointer generally points to the most recently filled location and may be updated for every subsequent word fetched to the particular cache line. Generally, only a single line may be filled at a time and thus a single global pointer may be sufficient for most designs. In some designs, multiple lines may be filled at the same time. Therefore, multiple fetch detections, multiple signals FILL and multiple global pointers may be implemented to track multiple simultaneous fetch operations.

For a request to access the data, a check is made to determine if the request points to (i) a cache line that is currently being filled or (ii) another cache line. The above technique enables storing only a single respective line pointer for each of the cache lines and allocating an additional single global pointer for the cache line that is currently being filled. Using the above techniques, cache system designs may use fewer registers than ordinary designs. The reduction in the number of registers generally results in a lower cost in terms of area, static power and dynamic power. The above techniques may also enable a varying length cache line at a cost of only one bit per line.

In some embodiments, the line pointers and the global pointer may point between the locations. The following examples are based on a 16-location (location A to location P) cache line. In a first example, a line pointer value of zero (e.g., left of the start location A) may indicate that all of the locations A-P hold valid data words. A line pointer value of one (e.g., between the locations A and B) may indicate that the location A has the invalid status and the remaining locations B-P have the valid status. A line pointer value of 16 may point to the right of the end location P and thus all locations A-P have the invalid status.

In a second example, the line pointers may point to the last invalid location of the first segment. A line pointer value of 0 or 17 generally indicates that all locations A-P have the valid status. A line pointer value of one may indicate that the start location A is invalid while the rest of the locations B-P are valid. A line pointer value of two may indicate that the first two locations A and B are invalid, while the remainder are valid. A line pointer value of 16 may indicate that all of the locations A-P are invalid. Other pointer arrangements may be implemented to meet the criteria of a particular application.

The functions performed by the diagrams of FIGS. 4-7 may be implemented using a conventional general purpose processor, digital computer, microprocessor, microcontroller, RISC (reduced instruction set computer) processor, CISC (complex instruction set computer) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products) or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions. As used herein, the term "simultaneously" is meant to describe events that share some common time period but the term is not meant to be limited to events that begin at the same point in time, end at the same point in time, or have the same duration.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
a memory device configured to (i) store a plurality of cache lines, each of said cache lines comprising a plurality of locations including a respective end location and (ii) access a particular one of said cache lines identified by a cache address signal; and
a controller configured to (i) buffer a plurality of line pointers, each of said line pointers (a) identifying a respective boundary location of said locations in one of said cache lines and (b) being moveable among said locations and (ii) generate said cache address signal in response to a processor address signal hitting a given one of said locations residing between said respective boundary location and said respective end location.

2. The apparatus according to claim 1, wherein said controller is further configured to (i) assert a tag hit signal in response to said processor address signal hitting said given location and (ii) generate a valid signal indicating that said given location has either a valid status or an invalid status.

3. The apparatus according to claim 2, wherein said controller is further configured to generate said cache address signal in response to (i) said tag hit signal being asserted and (ii) said valid signal indicating said valid status.

4. The apparatus according to claim 1, wherein said controller is further configured to buffer a global pointer, said global pointer identifying a last one of said locations having a valid status in a current one of said cache lines being fetched.

5. The apparatus according to claim 1, wherein said controller is further configured to assert a fill signal in response to said given location residing on a current one of said cache lines being fetched.

6. The apparatus according to claim 5, wherein said controller is further configured to generate said cache address signal in response to (i) a tag hit signal being asserted, (ii) a valid signal and (iii) said fill signal.

7. The apparatus according to claim 5, wherein said controller is further configured to wait until said fill signal is deasserted to conclude that said given location has an invalid status.

8. The apparatus according to claim 1, wherein said controller is further configured to arrange said memory device into a first configuration comprising a plurality first sets, each of said first sets comprising a first number of said cache lines.

9. The apparatus according to claim 8, where said controller is further configured to dynamically rearrange said memory device from said first configuration into a second configuration comprising a plurality of second sets, each of said second sets comprising a second number of said cache lines and said second number differing from said first number.

10. The apparatus according to claim 1, wherein in each of said cache lines previously fetched (i) all of said locations to one side of said respective boundary location have an invalid status and (ii) all of said locations to another side of said respective boundary location have a valid status.

11. A method of controlling a cache using a plurality of line pointers, comprising the steps of:
- (A) storing a plurality of cache lines in a memory of said cache, each of said cache lines comprising a plurality of locations including a respective end location;
- (B) buffering said line pointers in a controller of said cache, each of said line pointers (i) identifying a respective boundary location of said locations in one of said cache lines and (ii) being moveable among said locations;
- (C) generating a cache address signal with said controller in response to a processor address signal hitting a given one of said locations residing between said respective boundary location and said respective end location; and
- (D) accessing a particular one of said cache lines in said memory identified by said cache address signal.

12. The method according to claim 11, further comprising the steps of:
asserting a tag hit signal in response to said processor address signal hitting said given location; and
generating a valid signal indicating that said given location has either a valid status or an invalid status.

13. The method according to claim 12, wherein said generating of said cache address signal is in further response to (i) said tag hit signal being asserted and (ii) said valid signal indicating said valid status.

14. The method according to claim 11, further comprising the step of:
buffering a global pointer, said global pointer identifying a last one of said locations having a valid status in a current one of said cache lines being fetched.

15. The method according to claim 11, further comprising the step of:
asserting a fill signal in response to said given location residing on a current one of said cache lines being fetched.

16. The method according to claim 15, wherein said generating of said cache address signal is in further response to (i) a tag hit signal being asserted, (ii) a valid signal and (iii) said fill signal.

17. The method according to claim 15, further comprising the step of:
waiting until said fill signal is deasserted to conclude that said given location has an invalid status.

18. The method according to claim 11, further comprising the step of:
arranging said memory into a first configuration comprising a plurality first sets, each of said first sets comprising a first number of said cache lines.

19. The method according to claim 18, further comprising the step of:
dynamically rearranging said memory from said first configuration into a second configuration comprising a plurality of second sets, each of said second sets comprising a second number of said cache lines and said second number differing from said first number.

20. An apparatus comprising:
a memory device configured to (i) store a plurality of cache lines, each of said cache lines comprising a plurality of locations including a respective end location and (ii) access a particular one of said cache lines identified by a cache address signal; and
means for controlling configured to (i) buffer a plurality of line pointers, each of said line pointers (a) identifying a respective boundary location of said locations in one of said cache lines and (b) being moveable among said locations and (ii) generate said cache address signal in response to a processor address signal hitting a given one of said locations residing between said respective boundary location and said respective end location.

21. The method according to claim 11, wherein in each of said cache lines previously fetched (i) all of said locations to one side of said respective boundary location have an invalid status and (ii) all of said locations to another side of said respective boundary location have a valid status.

* * * * *